United States Patent [19]
Takahashi et al.

[11] 3,765,006
[45] Oct. 9, 1973

[54] LEVEL DETECTION CIRCUIT

[75] Inventors: Makoto Takahashi, Sagamihara; Takao Hashimoto, Kawasaki, both of Japan

[73] Assignee: Yashica Company Ltd., Tokyo, Japan

[22] Filed: Feb. 22, 1972

[21] Appl. No.: 228,192

[52] U.S. Cl. .......... 340/248 A, 315/154, 315/200 A, 340/221, 340/331, 356/226
[51] Int. Cl. ............................................ G08b 21/00
[58] Field of Search ............... 340/248 A, 221, 331, 340/83; 330/104; 315/200 A, 154; 356/226

[56] References Cited
UNITED STATES PATENTS

| | | | |
|---|---|---|---|
| 3,130,349 | 4/1964 | Mallory | 315/200 A UX |
| 3,511,574 | 5/1970 | Burgarella | 340/331 X |
| 3,594,088 | 7/1971 | Akiyama et al. | 356/226 |
| 3,597,095 | 8/1971 | Fukushimo | 356/226 |
| 3,620,142 | 11/1971 | Engelsmann et al. | 356/226 X |

*Primary Examiner*—John W. Caldwell
*Assistant Examiner*—Daniel Myer
*Attorney*—Flynn & Frishauf

[57] ABSTRACT

A converter, e.g., a photo resistor, converts a physical quantity such as light into an electrical quantity; a threshold amplifier is connected to the output terminal of the converter; first and second switching transistors are connected to the output side of said amplifier, to be driven alternately, and to control first and second display lamps. A feedback circuit having a resistor, and capacitor, respectively, connects the output of the transistors to the input of the amplifier. The circuit values are so chosen that, when the output of the converter just exceeds the threshold level of the amplifier, said amplifier becomes unstable (due to the R-C feedback circuit) to alternately illuminate said first and second display lamps; below or substantially above the threshold, the one, or other lamp is selectively continuously lit.

8 Claims, 5 Drawing Figures

| (a) | (b) |
|---|---|
|  |  |

3,765,006

LEVEL DETECTION CIRCUIT

BACKGROUND OF THE INVENTION

1. Field of the Invention

This invention relates to level detection circuits in which a certain physical quantity is converted into an electrical quantity, and the converted electrical quantity is used to provide an output indication whether said physical quantity is within a range of levels, or above or below the range. The level detection circuit of this invention is highly useful when utilized for photographic exposure applications in which the illumination intensity at the object is converted into an electrical quantity, and the converted electrical quantity is used to visualize if the illumination intensity is proper for selected exposures.

2. Description of the Prior Art

Various electronic detection circuits for determining exposure have been proposed in the art. For example, as disclosed in the Japanese Utility Model Publication No. 24,858/1968, the illumination intensity of the camera object can be divided into four steps or levels. The steps are indicated on a display lamp in four states: continuous illumination, continuous flashing, instant illumination or a single flash, and nonillumination.

Such a system has drawbacks. The indications must be distinguished for each other to judge the corresponding proper exposure. The heat effect of the display lamp is a factor in determining the flashing cycle and, hence, severe quality control is required for the production of the exposure detection circuit, and design freedom is limited.

SUMMARY OF THE INVENTION

Briefly, a converter converts a physical quantity, for example light, into an electrical quantity; a threshold amplifier is connected to the output terminal of said converter means; first and second switching elements are connected to the output side of said amplifier to be driven alternately; first and second display lamps are controlled by the outputs of said first second switching elements, respectively; a capacitor is connected between the output of said first switching element and the input of said amplifier; and a resistor is connected between the output of said second switching element and the input of said amplifier. When the output of said converter just exceeds the threshold level of said amplifier, said amplifier is energized to drive either said first or second switching element into conduction. The output of the switching elements is fedback to the input of the amplifier through the capacitor and resistor, respectively, so as to unstably control the amplifier to selectively alternately illuminate said first and second display lamps. Below, or substantially above the threshold, the amplifier will be stable and thus one, or the other lamp will be lit continuously.

BRIEF DESCRIPTION OF THE DRAWING

The invention can be more fully understood from the following detailed description when taken in conjunction with the accompanying drawings in which.

DESCRIPTION OF THE PREFERRED EMBODIMENT

Figure 1:
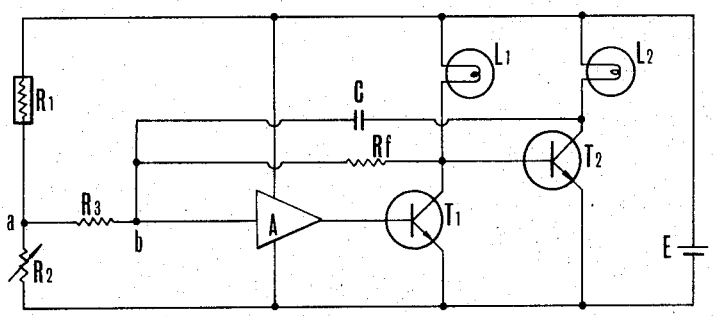
FIG. 1 is a circuit diagram showing a detection circuit embodying this invention.

In FIG. 1, the reference $R_1$ denotes a photoconductive element whose resistance value changes with change in the brightness of the object to be photographed, and $R_2$ a variable resistor, having a resistance value according to the sensitivity of the film used. For any one film, the value of this resistor $R_2$ is fixed. $R_3$ is a fixed resistor, and A an amplifier having a high input impedance. This amplifier delivers an output when the input exceeds a threshold level $Vp$. The reference $T_1$ represents a first transistor having its base electrode connected to the output terminal of the amplifier, $T_2$ a second transistor having its base electrode connected to the collector electrode of said first transistor $T_1$, E a power source, $L_1$ a display lamp connected between the collector electrode of said first transistor and the positive terminal of said power source, $L_2$ a display lamp connected between the source E, C a capacitor for positively feeding back the collector potential of said second transistor to the point $b$ which is the input terminal of said amplifier A, and $R_f$ a resistor for negatively feeding back the collector potential of said first transistor to the point $b$, namely, to the input terminal of said amplifier A. For the sake of explanation, it is assumed that $R_1$ and $R_2$ are smaller than $R_3$ in the resistance value and that the value of the variable resistor $R_2$ is fixed.

In the detection circuit arranged as above, a current I corresponding to the intensity of light incident upon the photoconductive element $R_1$ flows in the closed circuit: power source E — photoconductive element $R_1$ — variable resistor $R_2$ — power source E. By this current, a voltage drop Va, i.e., $R_2 \cdot I/(R_1 + R_2)$ is produced at the point $a$. This potential Va changes with change in the intensity of light incident upon the photoconductive element $R_1$. Thus, the variation of the potential Va at the point $a$ causes the lamps $L_1$ and $L_2$ to take the following modes.

1. $L_1$ turns off and $L_2$ turns on.
2. $L_1$ and $L_2$ turns on/off alternately.
3. $L_1$ turns on and $L_2$ turns off.

When the potential Va is increased in steps, the circuit is operated in the following manner.

Figure 2:
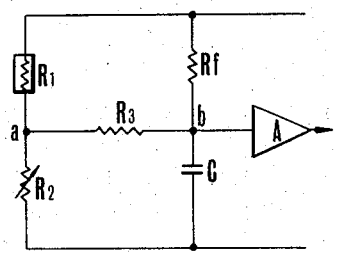
FIGS. 2(a) and 2(b) show equivalent circuits illustrating the operation of the circuit as in FIG. 1.
Figure 2:
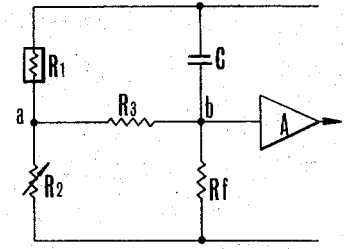
Figure 3:
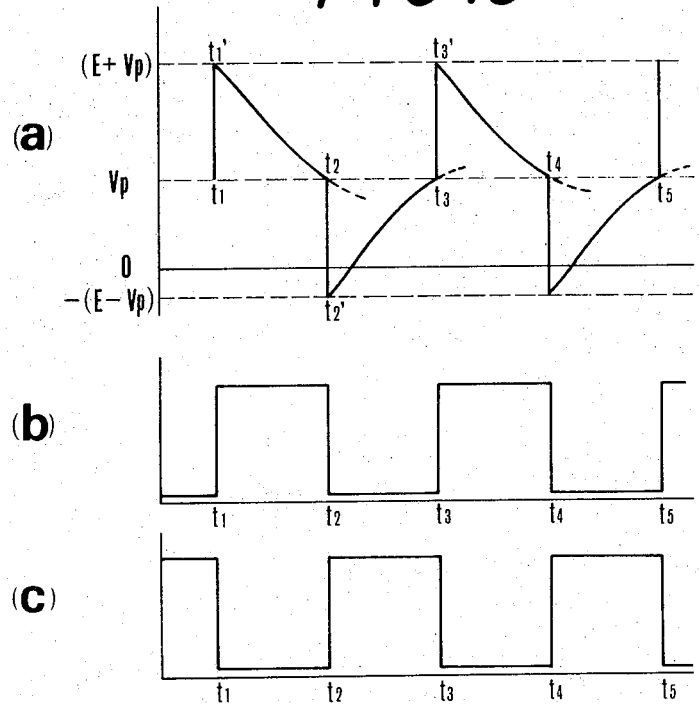
FIG. 3 shows waveforms illustrating the operation of the circuit as in FIG. 1.

When the potential Va is low, the potential Vb at the point $b$ is low accordingly. To maintain the potential Vb at the point $b$ (i.e., at the input terminal of the amplifier A) to be below the threshold level $Vp$ (FIG. 3) of the amplifier A, the amplifier A should not to deliver an output. Under this condition, the first transistor $T_1$ having its base electrode connected to the output end of the amplifier A is in off state, and the second transistor $T_2$ having its base electrode connected to the collector electrode of said first transistor $T_1$ is in on state. As a result, only the display lamp $L_2$ to which the collector electrode of the second transistor $T_2$ is connected is illuminated. This circuit status is equivalent to the circuit as shown in FIG. 2 (a) wherein the capacitor C is connected between the point $b$ and the ground, and the resistor $R_f$ is connected between the point $b$ and the power source E. In this circuit, the potential Vb at the point $b$ is given by the following equation, on the supposition that the amplifier A having a high input impedance has no effect on the circuit.

$$Vb = Va + (E - Va) \times [R_3/(R_3 + R_f)] \quad (1)$$

Thus, the range in which only the display lamp $L_2$ is kept illuminated, namely the potential $Va$ at the point $a$, at which the potential $Vb$ at the point $b$ becomes below the threshold level $Vp$ of the amplifier A, is determined by the following equation.

$$Vp > Vb = Va + (E - Va)[R_3/(R_3 + R_f)]$$

therefore, $$Va < Vp - (E - Vp)(R_3/R_f) \quad (2)$$

When the potential $Va$ at the point $a$ is increased, namely when the intensity of light incident upon the photoconductive element $R_1$ is increased, the potential $Vb$ at the point $b$ increases corresponding to the potential $Va$ at the point $a$. At a certain value, it will exceed the threshold level $Vp$ of the amplifier A. As a result, a voltage nearly equal to the voltage of the power source E appears at the output terminal of the amplifier A to which the potential $Vb$ is supplied as input. At the same time, the output of the first transistor $T_1$ turns on at time $t_1$ in FIG. 3(b). (This transistor has its base electrode connected to the output terminal of the amplifier A.) Also, the output of the second transistor $T_2$ turns off at time $T_2$ in FIG. 3(c). Under this condition, the capacitor C is connected between the point $b$ and the power source E, and the resistor $R_f$ is connected between the point $b$ and the ground, as shown in FIG. 2(b). As a consequence, the point $b$ stands instantaneously at a potential $(E + Vp)$ by the capacitor C at time $t_{1'}$ as shown in FIG. 3(a), and this potential is gradually lowered for the period from time $t_{1'}$ to $t_2$ as shown in FIG. 3(a). The potential drop at the point $b$ is given by the following equation.

$$Vb = \frac{Va \cdot R_f}{R_f + R_3} + \left[ E + Vp - \frac{Va \cdot R_f}{R_f + R_3} \right] e^{-\frac{t-t_{1'}}{\tau}} \quad (3)$$

where, $$\tau = [R_f R_3/(R_f + R_3)] \cdot C.$$

When the potential $Vb$ at the point $b$ is lowered during time $t_{1'} - t_2$ in FIG. 3(a) and becomes coincident with $Vp$, the output of the amplifier A falls rapidly to zero potential. The first transistor $T_1$ turns off at time $t_2$ in FIG. 3(b), and the second transistor $T_2$ turns on at time $t_2$ in FIG. 3(c). Under this condition, the capacitor C and resistor $R_f$ take positions in the circuit as shown in FIG. 2(a). As a result, the point $b$ instantaneously stands at the potential $-(E - Vp)$ by the capacitor C at time $t_{2'}$ in FIG. 3(a). After this, the potential $Vb$ at the point $b$ increases for the time $t_{2'} - t_2$ in FIG. 3(a) according to the following equation.

$$Vb = E\frac{R_3}{R_3 + R_f} + Va\frac{R_f}{R_3 + R_f}$$
$$- \left[ E - Vp + \frac{E \cdot R_3}{R_3 + R_f} + \frac{Va \cdot R_f}{R_3 + R_f} \right] e^{-\frac{t-t_{1'}}{\tau}} \quad (4)$$

where, $$\tau = [R_f R_3/(R_3 + R_f)] \cdot C.$$

When the potential $Vb$ at the point $b$ is increased for the period $t_{2'} - t_3$ in FIG. 3(a) according to Equation (4), and thus $Vb$ becomes coincident with the threshold level $Vp$, the amplifier A is operated in the same manner as described above. As a result, the first transistor $T_1$ turns on and the second transistor $T_2$ turns off. Accordingly, a flip-flop oscillation occurs in the circuit and thus the display lamp $L_1$ connected to the output end of the first transistor $T_1$ and the display lamp $L_2$ connected to the output end of the second transistor $T_2$ are illuminated alternately. The cycle T of this flip-flop oscillation is determined according to the following equation.

$$T = \tau \left\{ ln \frac{E + Vp - \frac{Va \cdot R_f}{R_f + R_3}}{Vp - \frac{Va \cdot R_f}{R_f + R_3}} \right.$$
$$\left. + ln \frac{E - Vp + \frac{ER_3 + Va \cdot R_f}{R_f + R_3}}{\frac{ER_3 + Va \cdot R_f}{R_f + R_3}} \right\} \quad (5)$$

where, $$\tau = [R_f R_3/R_3 + R_f)] \cdot C.$$

From Equations (3) and (4), it is apparent that the potential $Va$ at the point $a$ at which the flip-flop oscillation occurs to illuminate the lamps $L_1$ and $L_2$ alternately is in the range determined by the following equation.

$$Vp - (E - Vp)(R_3/R_f) \leq Va \leq Vp[1 + (R_3/R_f)] \quad (6)$$

Therefore, the condition $Vp - (E - Vp)(R_3/R_f) \leq Va$ is the lower limit and $Va \leq Vp[(1 + (R_3/R_f)]$ is the upper limit for the circuit to initiate flip-flop oscillation.

When the potential $Va$ at the point $a$ is high, namely when the intensity of light incident upon the photoconductive element $R_1$ is large, the circuit is operated in the following manner. When the potential $Va$ at the point $a$ is increased, the potential $Vb$ at the point $b$ is also increased.

When the potential $Vb$ exceeds the threshold level $Vp$ of the amplifier A, the potential at the output terminal of the amplifier A becomes nearly equal to the voltage of the power source E, the first transistor $T_1$ turns on, and the second transistor $T_2$ turns off. By this, the display lamp $L_1$ is illuminated. At this moment, the capacitor C and resistor $R_f$ are switched from the position shown in FIG. 2(a) to the position shown in FIG. 2(b). Under this condition, the potential at the point $b$ is lowered by the capacitor C; however, this potential is maintained above the threshold level $Vp$ because the potential $Va$ at the point $a$ is high enough. Thus, the amplifier A continues delivering output to the first transistor $T_1$ and, hence, the transistor $T_1$ is on and $T_2$ is off, and the display lamp $L_1$ is kept lighted The potential at the point $a$ at which only the lamp $L_1$ is kept illuminated is given by the following equation.

$$Vb = Va \times [R_f/(R_3 \times R_f)],$$

but $Vb > Vp$, then $Vp < Va \times [R_f/(R_3 + R_f)]$, therefore, $$Va > Vp\,[(1 + (R_3/R_f)] \quad (7)$$

In other words, it is possible to determine the proper exposure by the operation wherein $Vp\,[(1+(R_3/R_f)]$ is made coincident with the potential $Va$ at the point $a$ corresponding to the upper limit of the desired exposure, and $Vp-(E-Vp)(R_3/R_f)$ coincident with the potential $Va$ at the point $a$ corresponding to the lower limit of the desired exposure.

The above operation is summarized in the following table.

| Decision result | Potential at point $a$ | Lamp $L_1$ | Lamp $L_2$ |
| --- | --- | --- | --- |
| Under exposure | $0 < Va < Vp - (E-Vp)\frac{R_3}{R_f}$ | off | on |
| Proper exposure | $Vp - (E-Vp)\frac{R_3}{R_f} \leq Va \leq Vp\left(1+\frac{R_3}{R_f}\right)$ | on/off | off/on |
| Excess exposure | $Vp\left(1+\frac{R_3}{R_f}\right) < Va < E$ | on | off |

Figure 4:
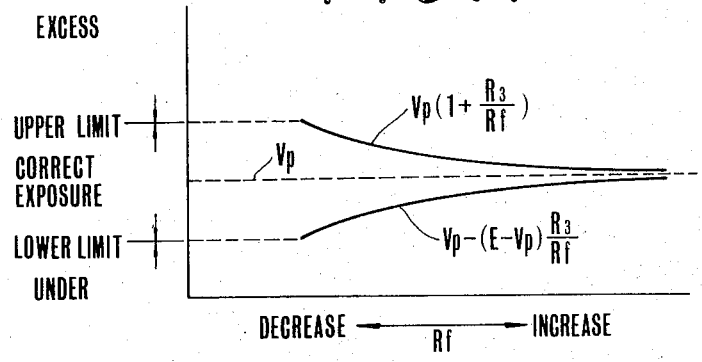
FIG. 4 is a graphic representation showing the operating characteristics of the circuit as in FIG. 1.

FIG. 4 shows the range in which the flip-flop oscillation occurs in the circuit; the curve (a) indicated by $Vp\,[(1+(R_3/R_f)]$ shows the upper limit of the desired range when the value of the resistor $R_f$ is varied, and the curve (c) indicated by $Vp-(E-Vp)(R_3/R_f)$ shows the lower limit of the desired range when the value of the resistor $R_f$ is varied. In other words the curves (a) and (c) form the range of the desired value. This range is narrowed with increase in the resistance value of $R_f$.

In the above embodiment, the collector electrode of the first transistor $T_1$ is connected to the input terminal of the amplifier A via a resistor, and the collector electrode of the second transistor $T_2$ is connected to the input terminal of the amplifier A via a capacitor. It is apparent that the invention is not limited to this example, but other connections may be employed. If the connection is modified, the phase relation should be the same as the above embodiment.

In the foregoing embodiment, a photoconductive element is used for exposure decision. Instead, a suitable transducer such as, for example, a thermistor may be used for measuring the temperature whereby a physical quantity is coverted into an electrical quantity to display the range of temperature.

According to the invention, as has been described above, various physical quantities can be easily judged according to the illuminating states of two display lamps. The detection circuit of this invention permits easy adjustment of the range of desired exposure value. Furthermore, the invention makes it readily possible to adjust the on/off cycle of the display lamps. If, therefore, display lamps of different colors are disposed so that these colors are mixed when the lamps are illuminated, a variety of color illumination can be obtained by the flip-flop oscillation. In addition, the decision given by the circuit of this invention is not affected by the characteristics of the display lamps.

While the principles of the invention have been described above in connection with a specific embodiment, and particular modifications thereof, it is to be clearly understood that this description is made only by way of example and not as a limitation of the scope of the invention.

What is claimed is:

1. A level detection circuit comprising:
   converter means (R1) for converting a physical quantity into an electric quantity; an amplifier (A) connected to the output terminal of said converter means, said amplifier having a threshold level; first and second switching elements (T2,T1) connected to the output side of said amplifier to be driven alternately thereby; first and second display lamps (L1, L2) controlled by the outputs of said first and second switching elements, respectively; a feedback capacitor (C) connected between the output of said first switching element (T2) and the input of said amplifier (A); and a feedback resistor (Rf) connected between the output of said second switching element (T1) and the input of said amplifier (A); wherein, when the output of said converter means exceeds the threshold level of said amplifier, said amplifier is operated to energize either said first or second switching element, the output of said first or second switching element being fed back to the input of said amplifier through said capacitor (C) and resistor (R), respectively, so as to selectively illuminate said first and second display lamps.

2. The discrimination circuit according to claim 1 wherein said first and second switching elements comprise transistors (T1, T2) connected in cascade, and said first and second display lamps are respectively connected to the collector electrodes of said transistors.

3. Circuit according to claim 1, wherein the threshold level of the amplifier (A), the electric quantity, the capacitance of the capacitor (C) and the resistance of the resistor (Rf) are so relatively adjusted that, when the output of the converter means (R1) just exceeds the threshold level of the amplifier, the amplifier is operated to energize the switching element (T1, T2) alternately, the output of said switching element being fed back to the input of the amplifier over said capacitor (C) and resistor (R) so that oscillations will result to selectively, alternately illuminate the first and second display lamps;

and, when the output of the converter means (R1) is beyond the threshold level, holding the amplifier in stable de-energized or energized operation, one of said switching elements only is continuously energized to selectively, continuously energize the one or other of said display lamps (L1, L2).

4. Circuit according to claim 3, wherein the feedback capacitor (C) and the feedback resistor (Rf) form a feedback circuit for the amplifier (A), said circuit comprising
impedance coupling means (R3) connecting the output of said converter means (R1) to the input of the amplifier, the respective relative values of the coupling means and the impedance of the feedback circuit determining the range of unstable operation of the amplifier.

5. Light level indicator circuit comprising
converter means (R1) for converting light levels into an electrical signal;
an amplifier (A) connected to the output terminal of the converter means (R1), said amplifier having a threshold level (Vp);
first (T2) and second (T1) switching elements connected to the output side of said amplifier (A) to be driven alternately thereby;
first (L1) and second (L2) display lamps controlled by the outputs of said first and second switching elements, respectively;
a capacitor (C) connected between the output of said first switching element (T2) and the input of the amplifier and the resistor (Rf) connected between the output of the second switching element (T1) and the input of the amplifier (A);
wherein the threshold levels of the amplifier (A), the electrical signal, the capacitance of the capacitor (C) and the resistance of the resistor (Rf) are so relatively adjusted and dimensioned that, when the output of the converter means (R1) just exceeds the threshold level of the amplifier, the amplifier is operated unstably to energize either said first or second switching element (T1, T2), the output of either said first or second switching element being fed back to the input of said amplifier over said capacitor (C) and resistor (Rf) so that oscillations will result, and to selectively alternately illuminate the first and second display lamp;
and, when the output of said converter means (R1) is beyond the threshold level of the amplifier (A) and holding the amplifier in stable de-energized or energized condition, a respective one of said switching elements only is continuously energized to selectively continuously energize one or the other of said display lamps (L1, L2).

6. Circuit according to claim 7, wherein said first and second switching elements comprise transistors connected in cascade, and said first and second display lamps are respectively connected to the collector electrodes of said transistors.

7. Circuit according to claim 7, wherein the feedback capacitor (C) and the feedback resistor (Rf) form a feedback circuit for the amplifier (A), and said circuit further comprises
a coupling resistor (R3) connecting the output of said converter means (R1) to the input of the amplifier, the respective relative resistance values of the coupling resistor (R3) connected to the input of the amplifier, and of the resistance of the feedback circuit being set to determine the range of unstable operation of the amplifier.

8. Circuit according to claim 7, for use in a camera to indicate proper exposure, further comprising
a source of power (E) to energize the amplifier, the switching elements, and the display lamps;
wherein the amplification of the amplifier, the potential supplied by the power source (E), the resistance value of the coupling resistor (R3), the feedback resistor (Rf and the resistance of the converter means (R1) are relatively selected to provide:
a. constant illumination of the first display lamp (L1) representative of excess light being detected;
b. constant illumination of the second display lamp (L2) being representative of deficient light being detected; and
c. alternate flashing of both said lamps being indicative of proper light level.

* * * * *